US011953955B2

(12) United States Patent
Huang et al.

(10) Patent No.: US 11,953,955 B2
(45) Date of Patent: Apr. 9, 2024

(54) FIXING MECHANISM, INTERFACE CARD ASSEMBLY AND ELECTRONIC APPARATUS

(71) Applicant: Wiwynn Corporation, New Taipei (TW)

(72) Inventors: Wei-Li Huang, New Taipei (TW); Wei-Hao Chen, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 34 days.

(21) Appl. No.: 17/521,867

(22) Filed: Nov. 9, 2021

(65) Prior Publication Data

US 2023/0063239 A1  Mar. 2, 2023

(30) Foreign Application Priority Data

Sep. 2, 2021  (TW) .................................. 110132614

(51) Int. Cl.
*G06F 1/18*      (2006.01)

(52) U.S. Cl.
CPC .................................. *G06F 1/186* (2013.01)

(58) Field of Classification Search
CPC ........ G06F 1/186; G06F 1/185; H05K 7/1405
See application file for complete search history.

(56) References Cited

U.S. PATENT DOCUMENTS 11,537,181 B1 * 12/2022 Wang ...................... G06F 1/186

* cited by examiner

*Primary Examiner* — James Wu
(74) *Attorney, Agent, or Firm* — Winston Hsu

(57) ABSTRACT

A fixing mechanism is applied to an interface card assembly and an electronic apparatus. The fixing mechanism includes a movable window and an operation component. The movable window is slidably disposed on a casing of the interface card assembly. The operation component has a fixed end and a free end opposite to each other. The fixed end is disposed on the movable window. The free end is detachably engaged with the casing to position the movable window. The movable window is positioned on one of a first region and a second region of the casing for respectively fixing interface cards with different sizes to the casing.

19 Claims, 9 Drawing Sheets

FIXING MECHANISM, INTERFACE CARD ASSEMBLY AND ELECTRONIC APPARATUS

BACKGROUND OF THE DISCLOSURE

1. Field of the Disclosure

The present disclosure relates to a fixing mechanism, an interface card assembly and an electronic apparatus, and more particularly, to a fixing mechanism suitable for interface cards with different sizes and the related interface card assembly and the related electronic apparatus.

2. Description of the Prior Art

Generally, a plurality of interface cards can be installed inside a server; with an advanced technology, different types of the server may need to install interface cards with different specifications, and multiple interface card slots and interface card assembly racks can be set up inside the server accordingly. A normal-width interface card and a double-width interface card are commonly used in the server, and the interface card slot of the server can accommodate two normal-width interface cards, which have the width similar to the width of the double-width interface card. Thus, the interface card slot of the server is applicable to the two normal-width interface cards or the single double-width interface card. When the two normal-width interface cards are installed on the interface card assembly rack, the positions of connectors of the two normal-width interface cards are slightly staggered to prevent interference, and two fixing mechanisms are staggered on the interface card assembly rack and used to respectively lock the two normal-width interface cards. If the double-width interface card is installed inside the server, the interface card slot of the server only can accommodate one double-width interface card, so that another type of the interface card assembly rack is replaced and disposed inside the server to match with the double-width interface card. Therefore, several types of the interface card assembly racks are attached or detached in accordance with specification requirements of the interface cards installed in the server. The conventional interface card assembly rack and the conventional server have drawbacks of troublesome operation, time-consuming disassembly and assembly, and high manufacturing cost.

SUMMARY OF THE DISCLOSURE

The present disclosure provides a fixing mechanism suitable for interface cards with different sizes and the related interface card assembly and the related electronic apparatus for solving above drawbacks.

According to the claimed disclosure, an interface card assembly includes a casing and a fixing mechanism. The casing has a lateral wall and an accommodating channel. The accommodating channel is adapted to accommodate one of a first interface card and a second interface card that have different sizes. The fixing mechanism includes a movable window and an operation component. The movable window is slidably disposed on the lateral wall. The operation component has a fixed end and a free end opposite to each other. The fixed end is disposed on the movable window, and the free end is detachably engaged with the lateral wall to position the movable window on the casing. The movable window is positioned on one of a first region and a second region of the lateral wall via the operation component for respectively fixing one of the first interface card and the second interface card to the lateral wall of the casing.

According to the claimed disclosure, the lateral wall includes a positioning slot, and the movable window includes an opening. The free end of the operation component passes through the opening and the positioning slot to position the movable window on the lateral wall.

According to the claimed disclosure, the movable window includes a first contacting portion, and the operation component includes a second contacting portion disposed on position adjacent to the free end and adapted to detachably contact against the first contacting portion.

According to the claimed disclosure, the first contacting portion is a protruding structure, and the second contacting portion is a sunken structure. The protruding structure contacts against an inner wall of the sunken structure for constraint.

According to the claimed disclosure, the fixing mechanism further includes a piercing pin, and the movable window further includes a sliding slot. The piercing pin passes through the sliding slot to set on the lateral wall. The sliding slot has a first slotted end and a second slotted end opposite to each other. One of the first slotted end and the second slotted end contacts against the piercing pin to stay the movable window in one of the first region and the second region of the lateral wall.

According to the claimed disclosure, the fixing mechanism further includes a positioning component slidably disposed on the lateral wall and adjacent to the movable window. The positioning component is adapted to clip one of the first interface card and the second interface card via the movable window.

According to the claimed disclosure, the positioning component includes a first engaging portion, and the movable window includes a second engaging portion disposed on position corresponding to the first engaging portion. The first engaging portion passes through a first concave on one of the first interface card and the second interface card to engage with the second engaging portion.

According to the claimed disclosure, the movable window includes a wedging portion adapted to pass through a second concave on one of the first interface card and the second interface card.

According to the claimed disclosure, the fixing mechanism further includes a buckling component movably disposed on the positioning component and adapted to pass through at least one buckling hole formed on the lateral wall.

According to the claimed disclosure, the positioning component includes a main body and a connecting piece. The connecting piece passes through an slot of the main body to slidably dispose the positioning component on the lateral wall.

According to the claimed disclosure, an electronic apparatus includes a chassis and an interface card assembly. The interface card assembly is disposed on the chassis. The interface card assembly includes casing and a fixing mechanism. The casing has a lateral wall and an accommodating channel. The accommodating channel is adapted to accommodate one of a first interface card and a second interface card that have different sizes. The fixing mechanism includes a movable window and an operation component. The movable window is slidably disposed on the lateral wall. The operation component has a fixed end and a free end opposite to each other. The fixed end is disposed on the movable window, and the free end is detachably engaged with the lateral wall to position the movable window on the casing. The movable window is positioned on one of a first region and a second region of the lateral wall via the operation component for respectively fixing one of the first interface card and the second interface card to the lateral wall of the casing.

According to the claimed disclosure, a fixing mechanism includes a movable window and an operation component. The movable window is slidably disposed on a casing. The operation component has a fixed end and a free end opposite to each other. The fixed end is disposed on the movable window, and the free end is detachably engaged with the casing to position the movable window. The movable window is positioned on one of a first region and a second region of the casing via the operation component for respectively fixing interface cards with different sizes.

The electronic apparatus of the present disclosure can be a server or any apparatus of installing the interface card. The electronic apparatus may optionally install the first interface card or the second interface card that has different sizes in accordance with the actual demand. Therefore, the present disclosure provides the interface card assembly and the fixing mechanism applied to the electronic apparatus with a multiple interface card mode. The interface card assembly and the fixing mechanism of the present disclosure can utilize the movable window to match with any of the first interface card and the second interface card, and then utilize the operation component and the positioning component to constrain the movements of the movable window and the applied interface card. Comparing to the prior art, the interface card assembly and the fixing mechanism of the present disclosure can use single mechanical design to adaptably install the interface cards with various sizes and standards, and have advantages of simple structure, easy operation and low cost.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
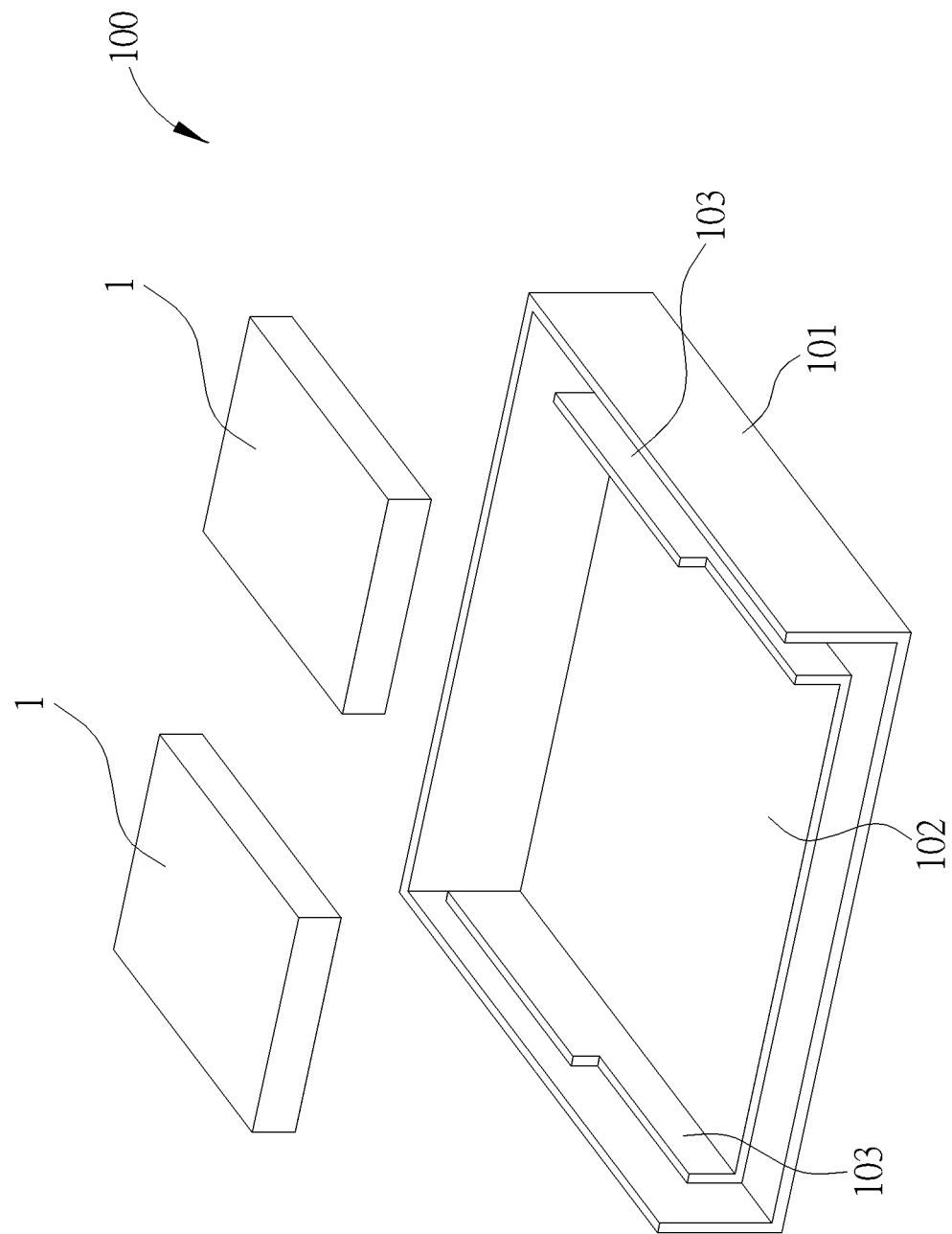
FIG. 1 is a diagram of an electronic apparatus according to an embodiment of the present disclosure.

Please refer to FIG. 1. FIG. 1 is a diagram of an electronic apparatus 100 according to an embodiment of the present disclosure. The electronic apparatus 100 can include a chassis 101, a circuit board 102, a transfer card 103 and an interface card assembly 1. The circuit board 102 can be disposed on a bottom inside the chassis 101. The transfer card 103 can be vertically set on the circuit board 102. A number and position of the transfer card 103 can correspond to a number and position of the interface card assembly 1. As an example shown in FIG. 1, the chassis 101 can accommodate two interface card assemblies 1, and two transfer cards 103 can be set on the circuit board 102. The two transfer cards 103 can be respectively set on a left side and a right side of the circuit board 102; or, one transfer card 103 may be set on a side of the circuit board 102, and the other transfer card 103 may be set on a middle of the circuit board 102. Arrangement of the transfer cards 103 can depend on a design demand.

Figure 2:
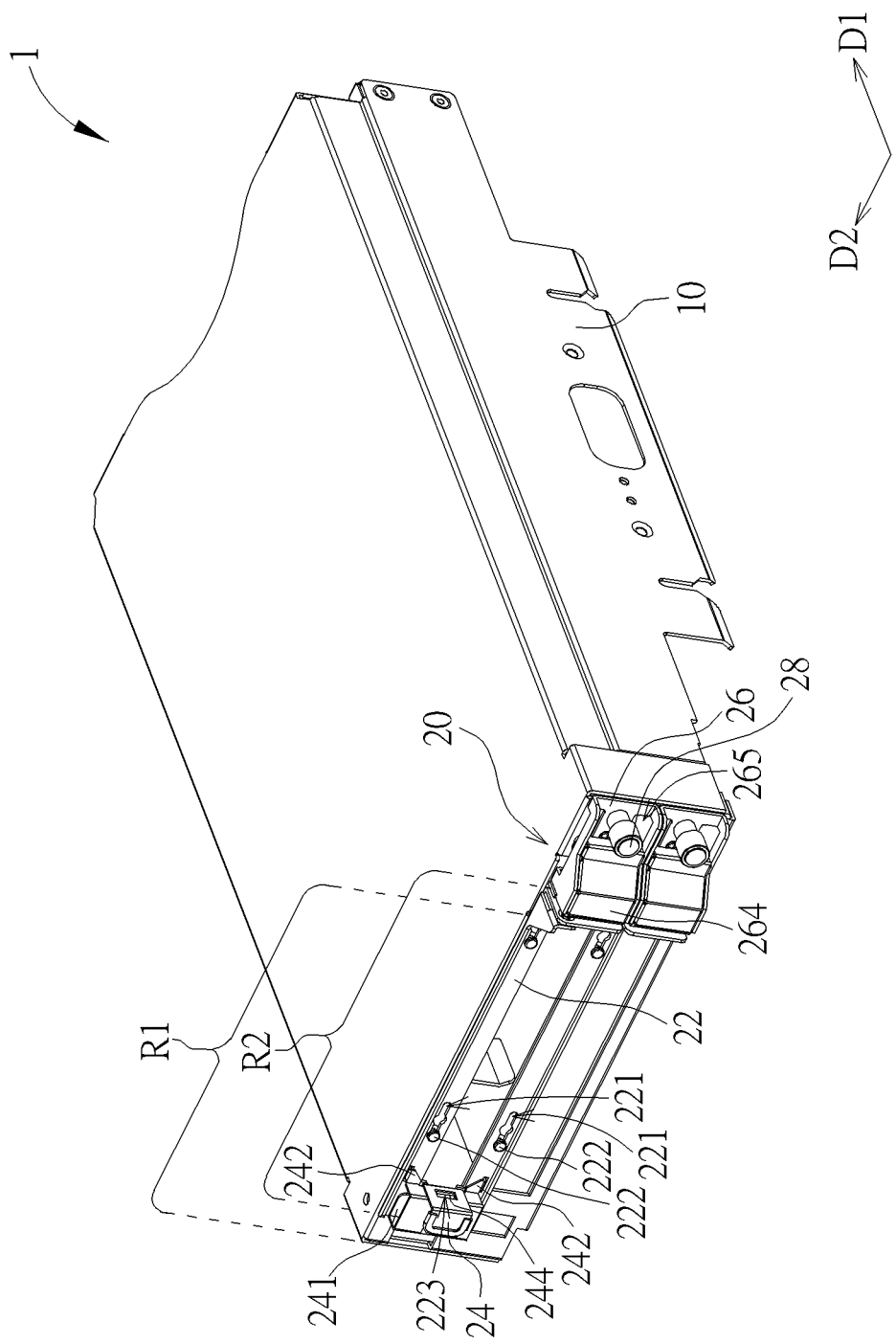
FIG. 2 is a diagram of the interface card assembly according to the embodiment of the present disclosure.
Figure 3:
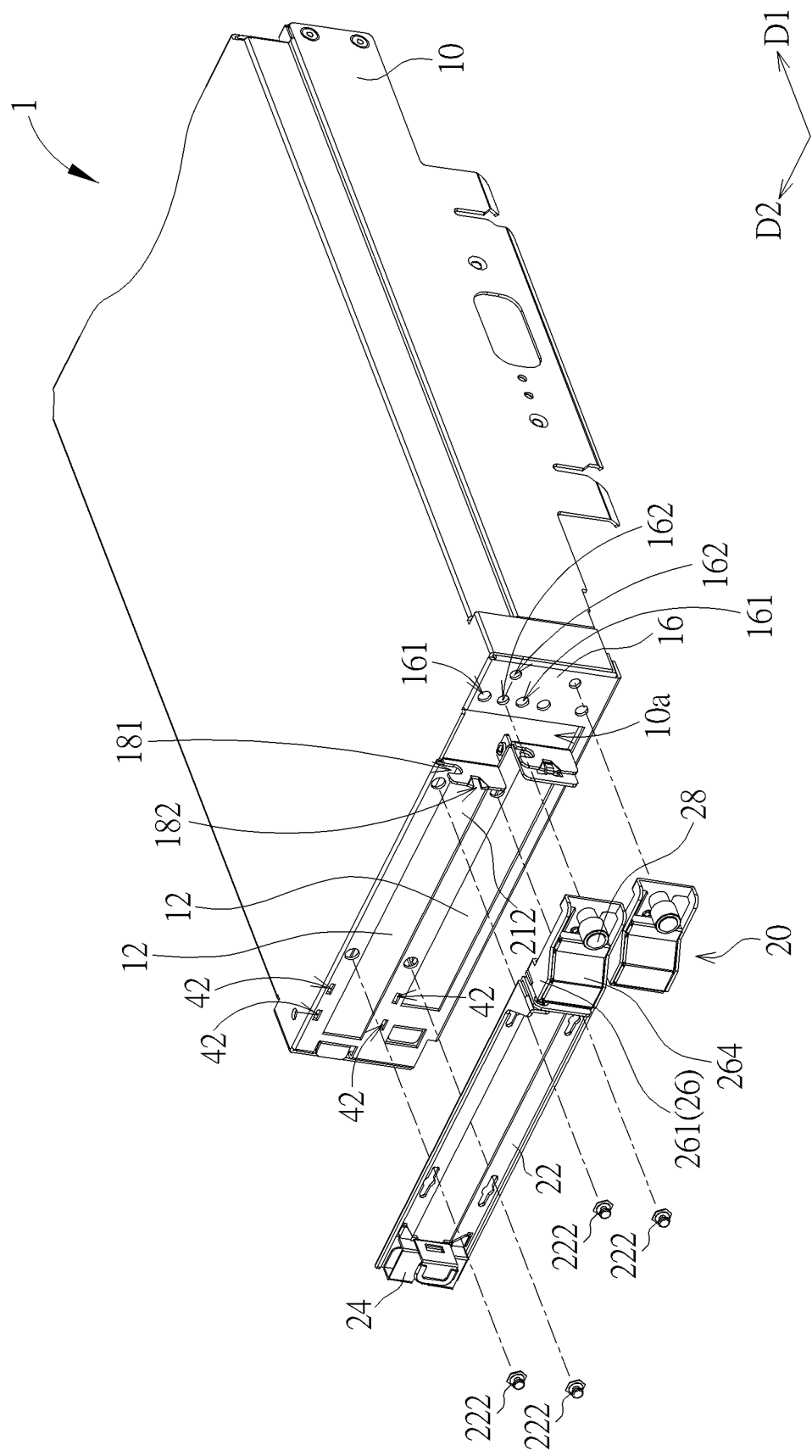
FIG. 3 and FIG. 4 are exploded diagrams of the interface card assembly in different operation modes according to the embodiment of the present disclosure.
Figure 4:
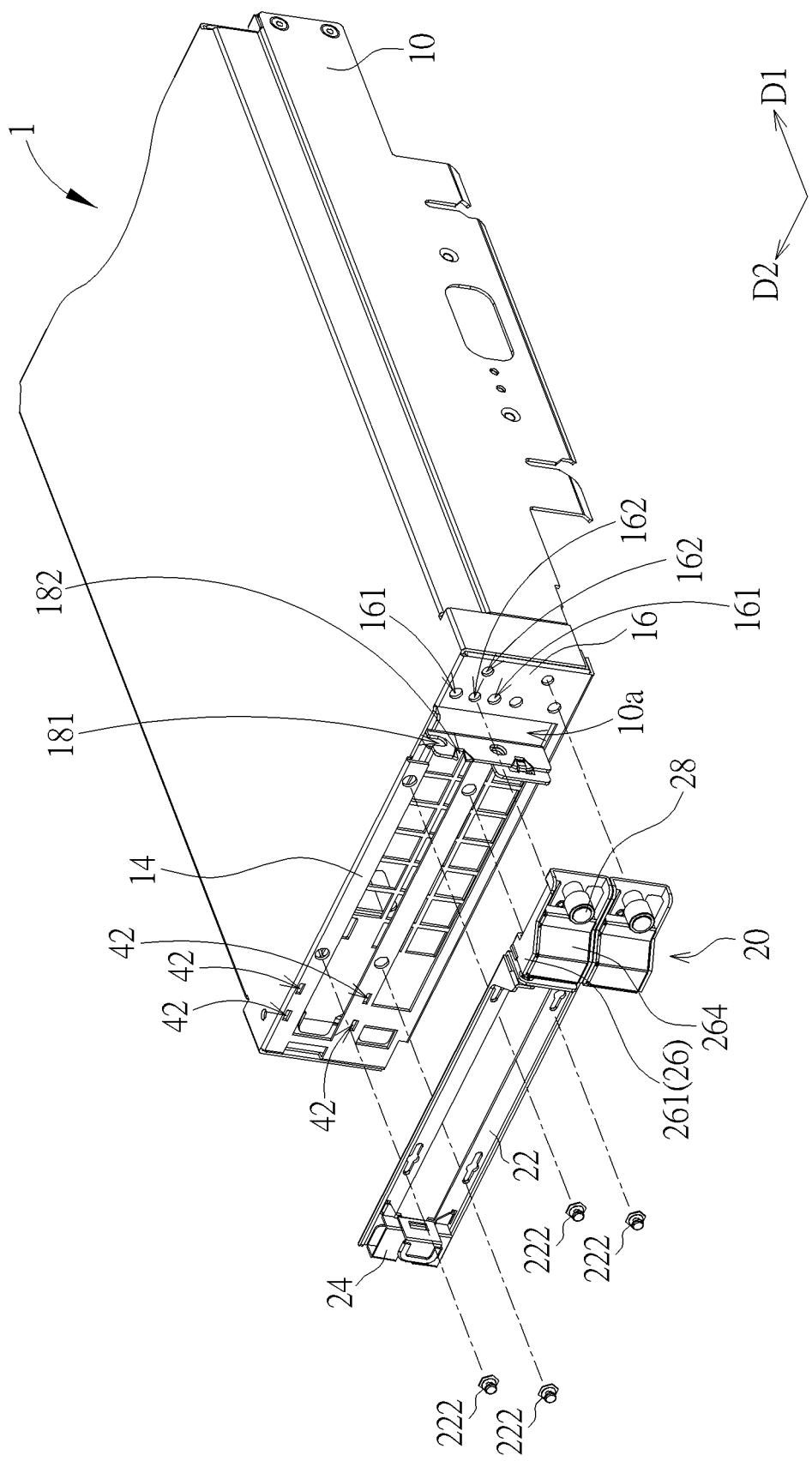

Please refer to FIG. 2 to FIG. 4. FIG. 2 is a diagram of the interface card assembly 1 according to the embodiment of the present disclosure. FIG. 3 and FIG. 4 are exploded diagrams of the interface card assembly 1 in different operation modes according to the embodiment of the present disclosure. The interface card assembly 1 can include a casing 10 and a fixing mechanism 20. The casing 10 can accommodate interface cards that have different sizes and specifications, such as a first interface card 12 and a second interface card 14. The first interface card 12 can be the interface card with a normal-width size, and the second interface card 14 can be the interface card with a double-width size; standards of the first interface card 12 and the second interface card 14 are not limited to the above-mentioned embodiments, and a detailed description is omitted herein for simplicity. The casing 10 can have several lateral walls, and the lateral walls are connected to form totally enclosed space or non-sealed space for being an accommodating channel 10a. The first interface card 12 and the second interface card 14 can be disposed inside the accommodating channel 10a. One of the lateral walls 16 of the casing 10 can be divided into a first region R1 and a second region R2 respectively set on different location. The fixing mechanism 20 can be disposed on the foresaid lateral wall 16, and can be moved to one of the first region R1 and the second region R2 in accordance with sizes and specifications of the interface card installed inside the casing 10, so as to stably fix one of the first interface card 12 and the second interface card 14 to the lateral wall 16 of the casing 10.

For example, as shown in FIG. 3, the casing 10 can accommodate two first interface cards 12. The two first interface cards 12 can be spaced from each other in a second direction D2 to prevent related connectors from being interfered with each other. In the situation, the fixing mechanism 20 can be moved to the first region R1 for fixing one of the first interface cards 12; and the other first interface card 12 may be fixed by another fixing mechanism 20 of the present disclosure or any conventional fixing mechanism. Further, as shown in FIG. 4, the casing 10 can optionally accommodate the second interface card 14 with the double size; meanwhile, the fixing mechanism 20 can be moved to the second region R2 for assembling and fixing the second interface card 14. Therefore, the present disclosure provides the fixing mechanism 20 and the interface card assembly 1 suitable for the interface cards with different sizes.

Figure 5:
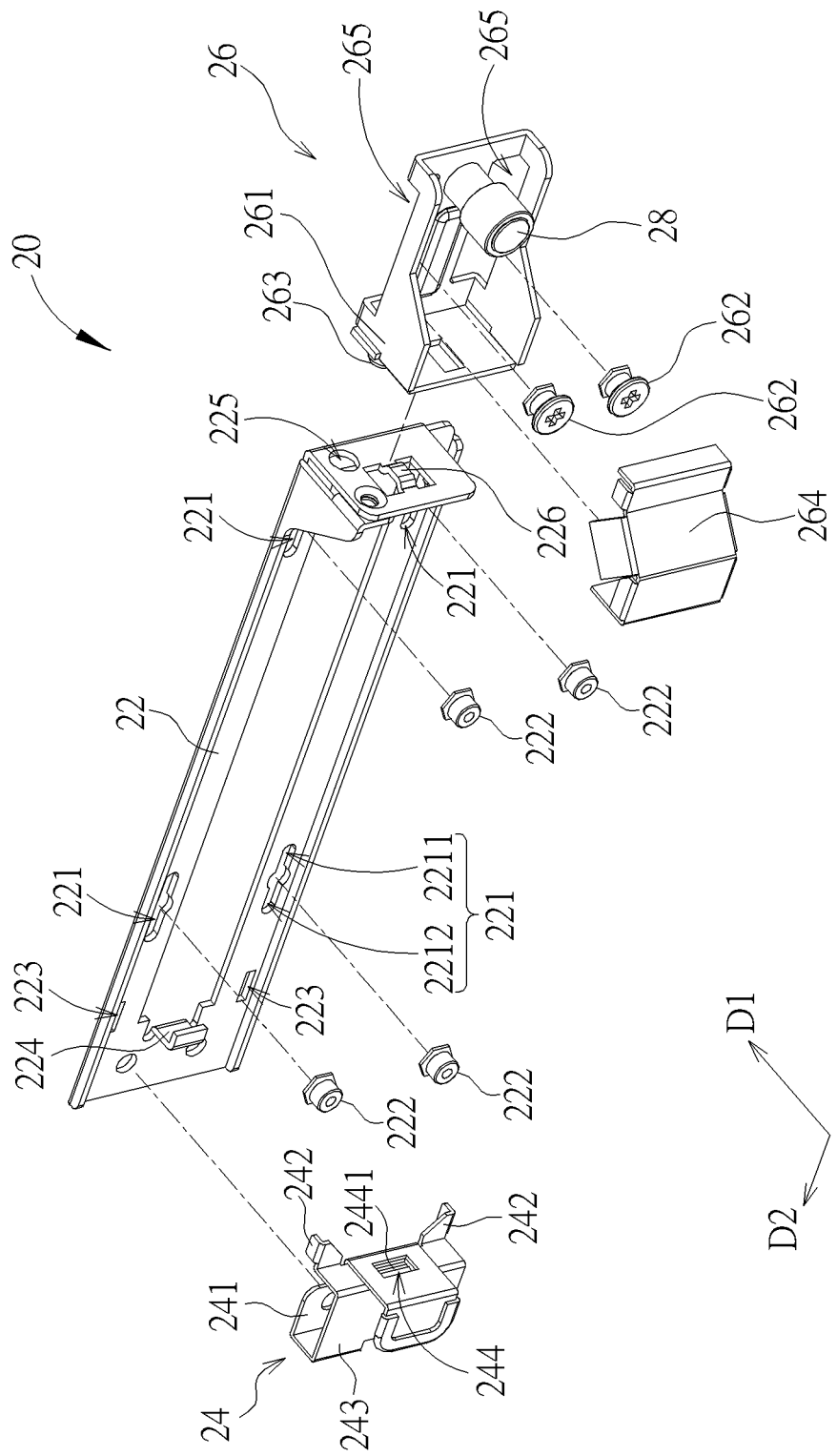
FIG. 5 and FIG. 6 are exploded diagrams of the fixing mechanism in different views according to the embodiment of the present disclosure.
Figure 6:
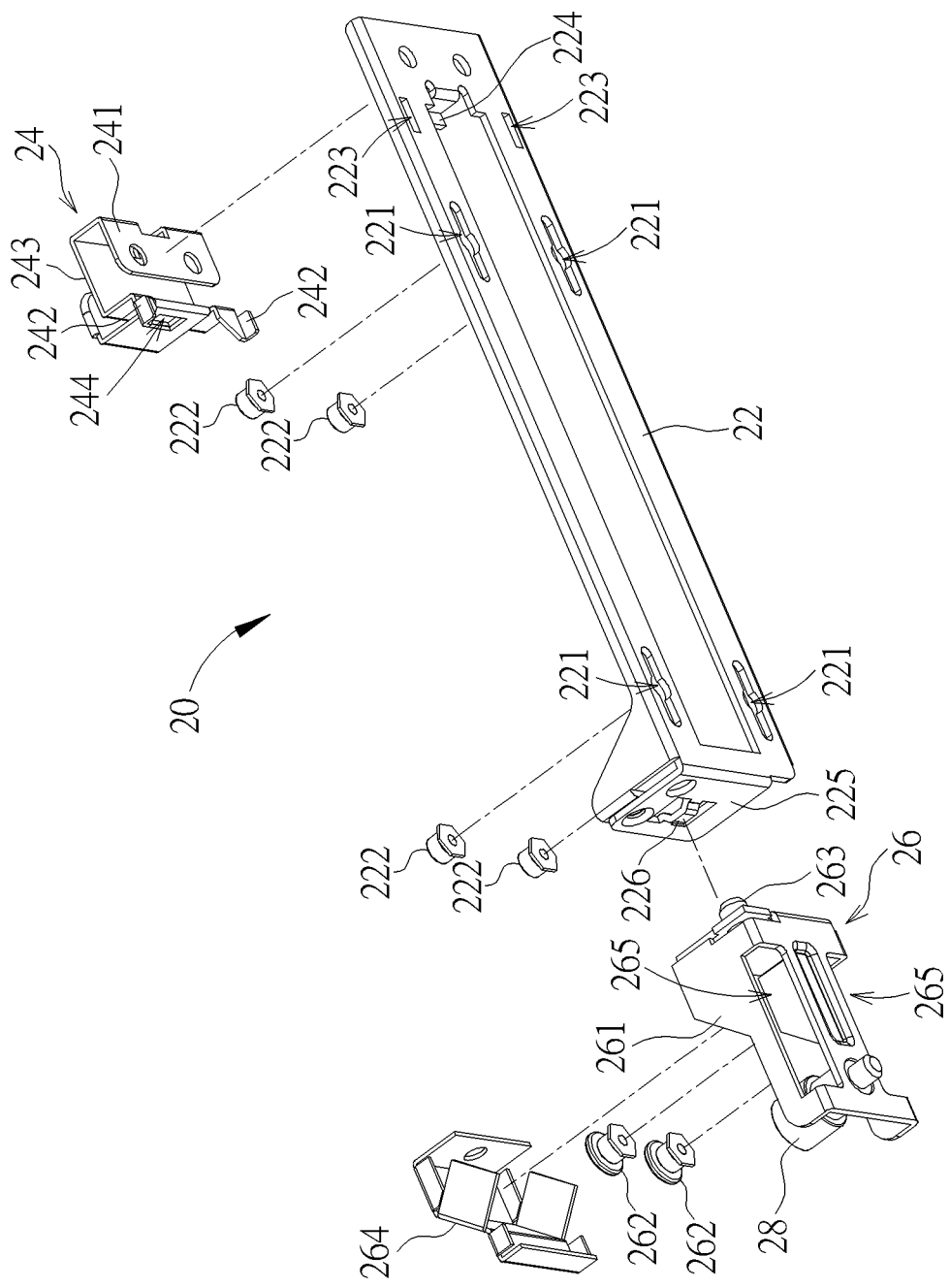

Please refer to FIG. 3 to FIG. 6. FIG. 5 and FIG. 6 are exploded diagrams of the fixing mechanism 20 in different views according to the embodiment of the present disclosure. The fixing mechanism 20 can include a movable window 22, an operation component 24, a positioning component 26 and a buckling component 28. The movable window 22 can be slidably disposed on the lateral wall 16 and freely moved between the first region R1 and the second region R2. The operation component 24 can be assembled to the movable window 22. When the movable window 22 is moved to one of the first region R1 and the second region R2, the operation component 24 can constrain a movement of the movable window 22 relative to the lateral wall 16 in the second direction D2. The positioning component 26 can be slidably disposed on position of the lateral wall 16 adjacent to the movable window 22, and can be used to clip one of the first interface card 12 and the second interface card 14 via cooperation of the movable window 22. The buckling component 28 can be movably disposed on the positioning component 26, and used to constrain a movement of the positioning component 26 relative to the lateral wall 16 in the second direction D2.

The movable window 22 can include one or plural sliding slots 221. The piercing pin 222 can pass through the sliding slot 221 and fix the movable window 22 to the lateral wall 16, so that the movable window 22 can be moved relative to the lateral wall 16 in a slotted direction of the sliding slot 221. Each sliding slot 221 can have a first slotted end 2211 and a second slotted end 2212 opposite to each other. When the movable window 22 is slid to the first slotted end 2211 and contacts against the piercing pin 222, the movable window 22 can stay in the first region R1 of the lateral wall 16; when the movable window 22 is slid to the second slotted end 2212 and contacts against the piercing pin 222, the movable window 22 can stay in the second region R2 of the lateral wall 16. A number of the piercing pin 222 can preferably correspond to a number of the sliding slot 221. A middle section of the sliding slot 221 can have a diameter greater than diameters of the first slotted end 2211 and the second slotted end 2212, and the piercing pin 222 can insert into the middle section for passing through the sliding slot 221. A shape and a function of the sliding slot 221 are not limited to the above-mentioned embodiment, which depends on an actual demand.

The operation component 24 can have a fixed end 241, a free end 242 and a bridging area 243. The bridging area 243 may be a multi-bending structure and used to provide a resilient recovering force. The fixed end 241 and the free end 242 can be respectively disposed on two opposite sides of the bridging area 243. The fixed end 241 can be disposed on the movable window 22 via fixing elements, such as a rivet or a screw. The free end 242 can pass through an opening 223 formed on the movable window 22 to insert into a positioning slot 42 of the lateral wall 16, so as to constrain a movement of the movable window 22 relative to the lateral wall 16. It should be mentioned that the free end 242 can be inserted into and separated from the positioning slot 42 via a resilient recovering function of the bridging area 243. For example, an external force can be applied to bend the operation component 24 for separating the free end 242 from the positioning slot 42; when the external force applied to the operation component 24 is removed, the resilient recovering force of the bridging area 243 can automatically drive the free end 242 to pass through the opening 223 and insert into the positioning slot 42.

Besides, the movable window 22 can further include a first contacting portion 224, and the operation component 24 can include a second contacting portion 244 disposed on a position adjacent to the free end 242. The second contacting portion 244 can contact against the first contacting portion 224 in a detachable manner, so as to avoid the free end 242 from being excessively distant from the movable window 22. When the external force is applied to bend the operation component 24, a moving distance of the free end 242 relative to the movable window 22 in a first direction D1 can be effectively constrained. In the embodiment, the first contacting portion 224 can be a protruding structure, such as a dual-bending structure or other similar structures; the second contacting portion 244 can be a sunken structure, such as an opening structure or other similar structures. The first contacting portion 224 (such as the protruding structure) can contact against an inner wall 2441 of the second contacting portion 244 (such as the sunken structure) to constrain an allowable moving distance of the free end 242.

As shown in FIG. 3 to FIG. 6, the positioning component 26 can include a first engaging portion 263, and the movable window 22 can include a second engaging portion 225 disposed on a position corresponding to the first engaging portion 263. The first engaging portion 263 can pass through a first concave 181 formed on one of the first interface card 12 and the second interface card 14 to engage with the second engaging portion 225, for constraining a movement of the first interface card 12 or the second interface card 14 in the first direction D1. Generally, the first engaging portion 263 can be a protrusion, and the second engaging portion 225 can be a hole or an indentation having a diameter similar to a diameter of the foresaid protrusion; further, the first engaging portion 263 may be set as the hole or the indentation, and the second engaging portion 225 may be accordingly set as the protrusion. Types of the first engaging portion 263 and the second engaging portion 225 can depend on the design demand.

In addition, the movable window 22 can further include a wedging portion 226, which can pass through a second concave 182 formed on one of the first interface card 12 and the second interface card 14, so as to constrain the movement of the first interface card 12 or the second interface card 14 in the second direction D2 perpendicular to the first direction D1. The wedging portion 226 may be the protruding structure manufactured in stamping process, or may be the protruding structure manufactured in soldering, locking or other metal process. Variation of the wedging portion 226 is not limited to the above-mentioned embodiment, and a detailed description is omitted herein for simplicity.

The positioning component 26 may include a main body 261, a connecting piece 262 and a covering portion 264. The buckling component 28 can pass through the main body 261 to insert into a buckling hole 162 formed on the lateral wall 16. A number of the buckling hole 162 is plural, such as the lateral wall 16 having two buckling holes 162. The two buckling holes 162 are spaced from each other along the direction D2, so that the buckling component 28 can insert into one of the buckling holes 162 in accordance with the movable window 22 stayed in the first region R1 or the second region R2, and the movements of the movable window 22 and the positioning component 26 relative to the lateral wall 16 can be constrained, and therefore one of the first interface card 12 and the second interface card 14 can be stably fixed inside the casing 10. Moreover, the main body 261 can include a slot 265. The connecting piece 262 can pass through the slot 265 to fix onto a hole 161 on the lateral wall 16, and then the main body 261 can be slid relative to the lateral wall 16. A number of the hole 161 can correspond to a number of the connecting piece 262. The covering portion 264 can be disposed on the main body 261 and used to shelter the connecting piece 262 and the slot 265.

Figure 7:
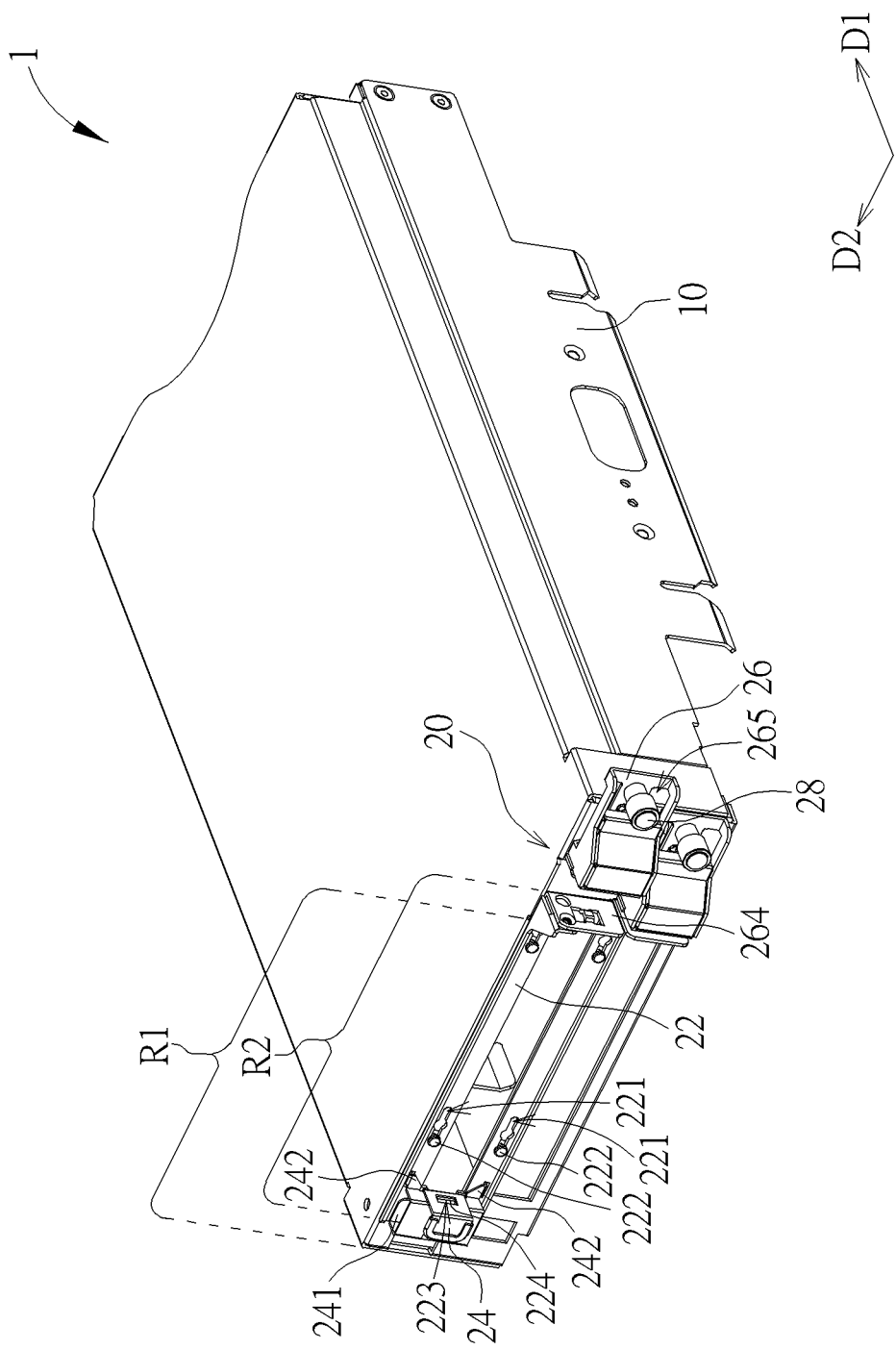
FIG. 7 to FIG. 9 are diagrams of the interface card assembly shown in FIG. 2 in another operation mode.
Figure 8:
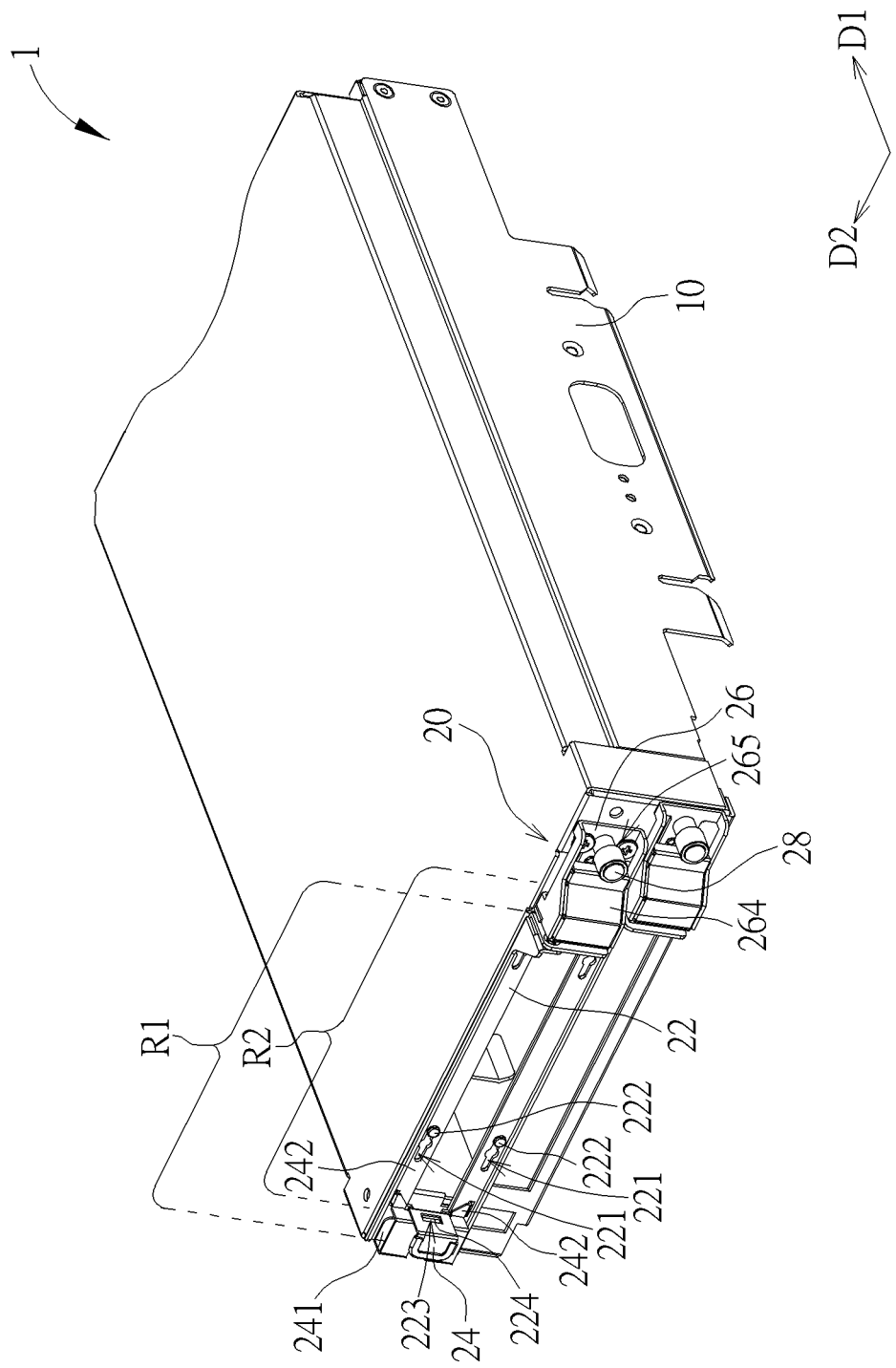
Figure 9:
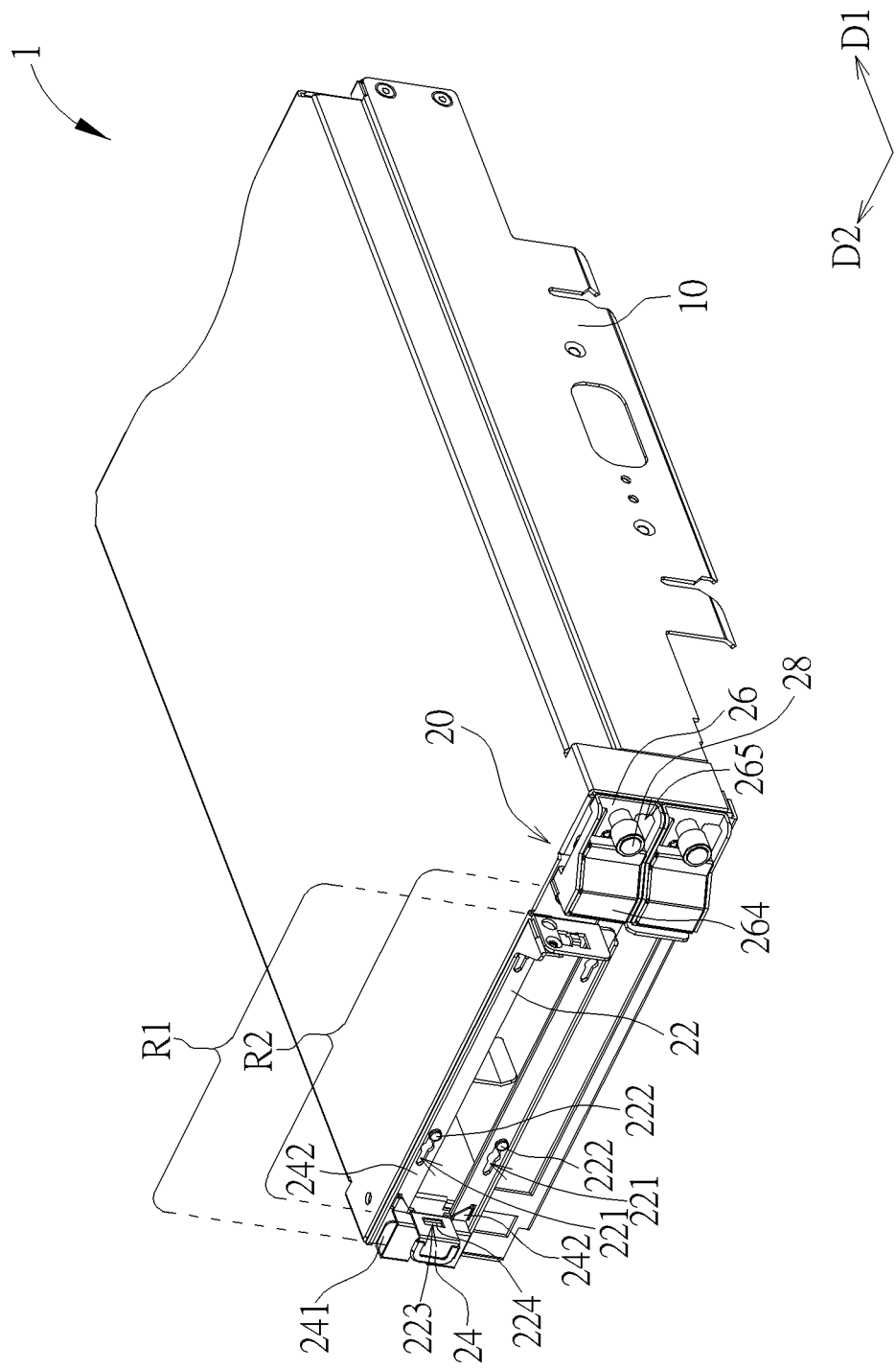

Please refer to FIG. 2 and FIG. 7 to FIG. 9. FIG. 7 to FIG. 9 are diagrams of the interface card assembly 1 shown in FIG. 2 in another operation mode. As shown in FIG. 2, the fixing mechanism 20 can be positioned on the second region R2 of the lateral wall 16, and the fixing mechanism 20 in this operation mode can fix the second interface card 14 shown in FIG. 4. For assembling or disassembling the second interface card 14, the external force can pull the buckling component 28 outwardly, such as being in a direction opposite to the first direction D1, for separating the buckling component 28 from the buckling hole 162 on the lateral wall 16. Then, the positioning component 26 can be pushed to the right, such as being in a direction opposite to the second direction D2, and the positioning component 26 can be moved to position shown in FIG. 7. When the second interface card 14 is assembled or disassembled, the positioning component 26 can be pushed back to position shown in FIG. 2; as if the external force applied to the buckling component 28 is removed, the buckling component 28 can insert into one of the buckling holes 162 on the lateral wall 16 automatically. Therefore, a spring of providing a recovering force may be installed inside the buckling component 28, and a type of the foresaid spring can depend on the design demand.

If the first interface card 12 is intended for use, the operation component 24 can be forced to separate the free end 242 from the opening 223 and the positioning slot 42, and then the movable window 22 can be moved from the second region R2 toward the first region R1 in the second direction D2; the external force applied to the operation component 24 can be removed so that the free end 242 can automatically pass through the opening 223 on the movable window 22 for inserting into one of the positioning slots 42 on the lateral wall 16. Then, the buckling component 28 can be pulled outwardly for being separated from the buckling hole 162 on the lateral wall 16, and the positioning component 26 can be pushed to the left toward the position shown in FIG. 8; when the external force applied to the buckling component 28 is removed, the buckling component 28 can automatically insert into one of the buckling hole 162 on the lateral wall 16, and then a switching function of the fixing mechanism 20 can be completed.

For assembling or disassembling the first interface card 12, the positioning component 26 can be pushed to the right toward position shown in FIG. 9; when the first interface card 12 is installed, the second concave 182 of the first interface card 12 can be engaged with the wedging portion 226 of the movable window 22, and then the positioning component 26 can be pushed to the left toward the position shown in FIG. 8, so that the first engaging portion 263 of the positioning component 26 can pass through the first concave 181 of the first interface card 12 to insert into the second engaging portion 225 of the movable window 22, for constraint of the first interface card 12. If the fixing mechanism 20 is intended to apply for the second interface card 14, the positioning component 26 can be moved to the right, and the operation component 24 can be bent to move the movable window 22 and the operation component 24 to the right and toward position shown in FIG. 2.

In conclusion, the electronic apparatus of the present disclosure can be a server or any apparatus of installing the interface card. The electronic apparatus may optionally install the first interface card or the second interface card that has different sizes in accordance with the actual demand. Therefore, the present disclosure provides the interface card assembly and the fixing mechanism applied to the electronic apparatus with a multiple interface card mode. The interface card assembly and the fixing mechanism of the present disclosure can utilize the movable window to match with any of the first interface card and the second interface card, and then utilize the operation component and the positioning component to constrain the movements of the movable window and the applied interface card. Comparing to the prior art, the interface card assembly and the fixing mechanism of the present disclosure can use single mechanical design to adaptably install the interface cards with various sizes and standards, and have advantages of simple structure, easy operation and low cost.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. An interface card assembly comprising:
   a casing having a lateral wall and an accommodating channel, the accommodating channel being adapted to accommodate one of a first interface card and a second interface card that have different sizes; and
   a fixing mechanism comprising:
      a movable window slidably disposed on the lateral wall; and
      an operation component having a fixed end and a free end opposite to each other, the fixed end being disposed on the movable window, and the free end being detachably engaged with the lateral wall to position the movable window on the casing;
      wherein the movable window is slidably moved between a first region and a second region of the lateral wall via the operation component for respectively fixing one of the first interface card and the second interface card to the lateral wall of the casing;
      wherein the lateral wall comprises a positioning slot, the movable window comprises an opening, the free end of the operation component passes through the opening and the positioning slot to position the movable window on the lateral wall.

2. The interface card assembly of claim 1, wherein the movable window comprises a first contacting portion, the operation component comprises a second contacting portion disposed on position adjacent to the free end and adapted to detachably contact against the first contacting portion.

3. The interface card assembly of claim 2, wherein the first contacting portion is a protruding structure, the second contacting portion is a sunken structure, and the protruding structure contacts against an inner wall of the sunken structure for constraint.

4. The interface card assembly of claim 1, wherein the fixing mechanism further comprises a piercing pin, the movable window further comprises a sliding slot, the piercing pin passes through the sliding slot to set on the lateral wall, the sliding slot has a first slotted end and a second slotted end opposite to each other, one of the first slotted end and the second slotted end contacts against the piercing pin to stay the movable window in one of the first region and the second region of the lateral wall.

5. The interface card assembly of claim 1, wherein the fixing mechanism further comprises a positioning component slidably disposed on the lateral wall and adjacent to the movable window, the positioning component is adapted to clip one of the first interface card and the second interface card via the movable window.

6. The interface card assembly of claim 5, wherein the positioning component comprises a first engaging portion, the movable window comprises a second engaging portion disposed on position corresponding to the first engaging portion, the first engaging portion passes through a first concave on one of the first interface card and the second interface card to engage with the second engaging portion.

7. The interface card assembly of claim 6, wherein the movable window comprises a wedging portion adapted to pass through a second concave on one of the first interface card and the second interface card.

8. The interface card assembly of claim 5, wherein the fixing mechanism further comprises a buckling component movably disposed on the positioning component and adapted to pass through at least one buckling hole formed on the lateral wall.

9. The interface card assembly of claim 5, wherein the positioning component comprises a main body and a connecting piece, the connecting piece passes through a slot of the main body to slidably dispose the positioning component on the lateral wall.

10. An electronic apparatus comprising:
a chassis; and
an interface card assembly disposed on the chassis, the interface card assembly comprising:
   a casing having a lateral wall and an accommodating channel, the accommodating channel being adapted to accommodate one of a first interface card and a second interface card that have different sizes; and
   a fixing mechanism comprising:
      a movable window slidably disposed on the lateral wall; and
      an operation component having a fixed end and a free end opposite to each other, the fixed end being disposed on the movable window, and the free end being detachably engaged with the lateral wall to position the movable window on the casing;
   wherein the movable window is slidably moved between a first region and a second region of the lateral wall via the operation component for respectively fixing one of the first interface card and the second interface card to the lateral wall of the casing;
   wherein the lateral wall comprises a positioning slot, the movable window comprises an opening, the free end of the operation component passes through the opening and the positioning slot to position the movable window on the lateral wall.

11. The electronic apparatus of claim 10, wherein the movable window comprises a first contacting portion, the operation component comprises a second contacting portion disposed on position adjacent to the free end and adapted to detachably contact against the first contacting portion.

12. The electronic apparatus of claim 11, wherein the first contacting portion of the movable window is a protruding structure, the second contacting portion of the operation component is a sunken structure, and the protruding structure contacts against an inner wall of the sunken structure for constraint.

13. The electronic apparatus of claim 10, wherein the fixing mechanism further comprises a piercing pin, the movable window further comprises a sliding slot, the piercing pin passes through the sliding slot to set on the lateral wall, the sliding slot has a first slotted end and a second slotted end opposite to each other, one of the first slotted end and the second slotted end contacts against the piercing pin to stay the movable window in one of the first region and the second region of the lateral wall.

14. The electronic apparatus of claim 10, wherein the fixing mechanism further comprises a positioning component slidably disposed on the lateral wall and adjacent to the movable window, the positioning component is adapted to clip one of the first interface card and the second interface card via the movable window.

15. The electronic apparatus of claim 14, wherein the positioning component comprises a first engaging portion, the movable window comprises a second engaging portion disposed on position corresponding to the first engaging portion, the first engaging portion passes through a first concave on one of the first interface card and the second interface card to engage with the second engaging portion.

16. The electronic apparatus of claim 15, wherein the movable window comprises a wedging portion adapted to pass through a second concave on one of the first interface card and the second interface card.

17. The electronic apparatus of claim 14, wherein the fixing mechanism further comprises a buckling component movably disposed on the positioning component and adapted to pass through at least one buckling hole formed on the lateral wall.

18. The electronic apparatus of claim 14, wherein the positioning component comprises a main body and a connecting piece, the connecting piece passes through a slot of the main body to slidably dispose the positioning component on the lateral wall.

19. A fixing mechanism comprising:
   a movable window slidably disposed on a casing; and
   an operation component having a fixed end and a free end opposite to each other, the fixed end being disposed on the movable window, and the free end being detachably engaged with the casing to position the movable window;
   wherein the movable window is slidably moved between a first region and a second region of the casing via the operation component for respectively fixing interface cards with different sizes;
   wherein the casing comprises a positioning slot, the movable window comprises an opening, the free end of the operation component passes through the opening and the positioning slot to position the movable window on the casing.

* * * * *